(12) United States Patent
Turunen

(10) Patent No.: US 10,900,173 B2
(45) Date of Patent: Jan. 26, 2021

(54) ROLL AND ITS USE

(71) Applicant: Valmet Technologies, Inc., Espoo (FI)

(72) Inventor: Jani Turunen, Lievestuore (FI)

(73) Assignee: VALMET TECHNOLOGIES, INC., Espoo (FI)

(*) Notice: Subject to any disclaimer, the term of this patent is extended or adjusted under 35 U.S.C. 154(b) by 147 days.

(21) Appl. No.: 16/201,874

(22) Filed: Nov. 27, 2018

(65) Prior Publication Data

US 2019/0161913 A1   May 30, 2019

(30) Foreign Application Priority Data

Nov. 28, 2017 (FI) .................................. 20176066

(51) Int. Cl.
| | |
|---|---|
| *B32B 1/00* | (2006.01) |
| *D21F 9/04* | (2006.01) |
| *B32B 27/20* | (2006.01) |
| *B32B 27/40* | (2006.01) |
| *B32B 27/38* | (2006.01) |
| *D21F 3/10* | (2006.01) |

(Continued)

(52) U.S. Cl.
CPC ............ *D21F 9/046* (2013.01); *B32B 1/00* (2013.01); *B32B 27/20* (2013.01); *B32B 27/38* (2013.01); *B32B 27/40* (2013.01); *C08K 3/22* (2013.01); *C08K 7/24* (2013.01); *D21F 1/40* (2013.01); *D21F 3/08* (2013.01); *D21F 3/105* (2013.01); *D21G 1/02* (2013.01); *D21G 1/0213* (2013.01); *D21G 1/0246* (2013.01); *D21H 23/58* (2013.01); *B32B 2264/102* (2013.01); *C08K 2003/2227* (2013.01)

(58) Field of Classification Search
USPC ........................................................ 162/202
See application file for complete search history.

(56) References Cited

U.S. PATENT DOCUMENTS

| | | | | |
|---|---|---|---|---|
| 5,895,689 A | * | 4/1999 | Gajewski ............... | C08G 18/10 427/385.5 |
| 6,027,769 A | * | 2/2000 | Gajewski ............... | B05D 1/002 427/177 |

(Continued)

FOREIGN PATENT DOCUMENTS

| | | |
|---|---|---|
| CN | 102757720 A | 10/2012 |
| CN | 104220670 A | 12/2014 |

(Continued)

OTHER PUBLICATIONS

Chinese Search Report.

(Continued)

*Primary Examiner* — Mark Halpern
(74) *Attorney, Agent, or Firm* — Stiennon & Stiennon

(57) ABSTRACT

The present invention relates to a roll for use in a manufacture of a fibrous web comprising cellulosic fibers. The roll comprises a roll body with a cylindrical surface, and a roll cover, which is arranged to cover the cylindrical surface of the roll body. The cover comprises a functional layer, which comprises a polymer matrix and filler particles embedded in the polymer matrix. The filler particles comprise hollow spherical particles of aluminium oxide, titanium oxide, zirconium oxide and/or silicon carbide, which hollow particles have a particle size of ≥200 μm.

21 Claims, 1 Drawing Sheet

(51) Int. Cl.
    *D21F 3/08*     (2006.01)
    *C08K 3/22*     (2006.01)
    *C08K 7/24*     (2006.01)
    *D21G 1/02*     (2006.01)
    *D21H 23/58*     (2006.01)
    *D21F 1/40*     (2006.01)

(56) References Cited

U.S. PATENT DOCUMENTS

| | | | |
|---|---|---|---|
| 8,647,475 | B2 | 2/2014 | Turunen |
| 8,663,428 | B2 | 3/2014 | Shieh |
| 8,712,307 | B2 | 4/2014 | Sakakibara et al. |
| 9,267,235 | B2 * | 2/2016 | Lippl .................. D21F 3/08 |
| 2009/0047048 | A1 | 2/2009 | Ikeda et al. |
| 2013/0105101 | A1 * | 5/2013 | Turunen ............... D21F 3/08 |
| | | | 162/297 |
| 2015/0051318 | A1 | 2/2015 | Grohmann et al. |
| 2017/0274625 | A1 | 9/2017 | Shimazaki et al. |

FOREIGN PATENT DOCUMENTS

| | | |
|---|---|---|
| CN | 104540992 A | 4/2015 |
| CN | 106574653 A | 4/2017 |
| DE | 102004056318 A1 | 5/2006 |
| DE | 102007000505 A1 | 4/2009 |
| EP | 0487477 A1 | 5/1992 |
| JP | 4587152 A | 9/2002 |
| WO | 2008000824 A1 | 1/2008 |
| WO | 2011128491 A1 | 10/2011 |

OTHER PUBLICATIONS

European Search Report for EP18208424 dated Jan. 9, 2019.
Finnish Patent and Registration Office Search Report for Patent Application No. 20176066, dated May 31, 2018.
"Hollow corundum microspheres", https://web.archive.org/web/20170301052337/http://t-tiss.com/eng/production/hollow-corundum-microspheres.html., Mar. 1, 2017 from web archive accessed on Nov. 26, 2018.

* cited by examiner

ROLL AND ITS USE

CROSS REFERENCES TO RELATED APPLICATIONS

This application claims priority on Finnish application No. FI 20176066, filed Nov. 28, 2017, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a roll for use in the manufacture of a fibrous web comprising cellulosic fibers.

Various polymer coated rolls are used in manufacture of fibrous webs, such as webs of paper, board, tissue or the like. Rolls can be used in several parts of the manufacturing process, both in paper, board and tissue machines, as well as in converting and finishing machines, such as calenders and coating units. Non-limiting examples of various polymer coated rolls are calender rolls, coater rolls, reeling drums, press rolls and guide rolls.

Conventionally the rolls are coated with one or several polymer layers. A roll cover typically comprises a polymer matrix, where various fillers, reinforcing fibers and/or additives may be included. The mechanical properties of the roll cover are influenced by the polymer matrix itself as well as by the used fillers, reinforcing fibers and/or modifiers. The fillers, fibers and/or modifiers change the mechanical properties of the roll cover, and consequently of the roll surface.

The roll and roll covers are subjected to extreme conditions in the manufacture of fibrous webs. They must tolerate high rotational speeds, and the associated forces. Furthermore, they come into contact with a fast moving fibrous web and possibly also other process equipment, such as doctor blades. They may also be subjected to a press from an adjacent roll. The requirements for mechanical resistance, wear resistance, impact resistance, tensile strength and hardness are thus rigorous for the roll covers. Furthermore, the emphasis between the various requirements varies depending on the location of the roll in the fiber manufacturing process.

May be the harshest conditions for roll covers are encountered by calender rolls and press rolls which are in a nip contact against a counter roll. The size of the calender rolls is typically 3-12 m in length and 400-1500 mm in diameter. The magnitude of linear loads in these rolls can be as high as 300-600 N/mm. The modem calender rolls are most often covered by fiber reinforced epoxy. The role of the roll cover is important not only for the process runnability but also to the paper product itself. The paper web is led to the calender nip unsupported, i.e. without a supporting fabric, wherein the paper web comes in a direct contact with the calender roll surfaces. The gloss and smoothness of the finished paper is created in calender nips, and also the bulk of the produced paper is either saved or lost there.

When more elasticity is needed a roll covered by polyurethanes or rubber mixtures can be used. Such rolls comprise press rolls in the press section of the paper or board machine, suction rolls in the wire section and in the press section, as well as sizer rolls and film transfer rolls in surface finishing or coating of the web. In those positions the roll surface is in abrading contact with the web or the fabric supporting the web, and, in addition, the roll surface is exposed to high loads in a nip contact with a counter roll.

The above mentioned rolls are thus exposed to and must survive in extreme wearing environments. Simultaneously the roll surface should remain faultless to ensure good web quality and good runnability of the machine.

Important properties of roll covers are long operating life, good wear resistance and low heat generation under dynamic load. Especially, long operational life improves productivity of the machine. Operating life depends on several factors, specifically, wear resistance, tear strength and resistance to crack development.

Use of fillers in roll covers to adjust their properties is well known. Fillers are used, inter alia, to adjust ductility, strength, elasticity, wear resistance, hardness, thermal resistance and release properties of the roll cover. Typical fillers comprise metal particles or ceramic particles, such as silicates, silicon oxides, silicon carbides, aluminium oxide or carbon black. Examples of such fillers in roll covers are disclosed for example in EP 487 477. Fillers used less commonly and for special purposes are, for example, titanium dioxide and synthetic powders, such as disclosed in WO 2008000824. The amount of filler may be, for example, 10-80 parts-of-weight of filler to 100 parts-of-weight of polymer (phr). A problem with the use of fillers is that while fillers improve one of the roll cover properties they often simultaneously decrease some other property. As a result, compromises are to be done.

Consequently, there is a continuing need to improve the mechanical properties of roll covers in an easy and cost-effective manner.

SUMMARY OF THE INVENTION

An object of this invention is to minimise or even totally eliminate the disadvantages existing in the prior art.

Another object of the present invention is to provide a roll with improved mechanical properties, especially with improved wear resistance and optionally also with improved tensile strength, hardness, impact strength and/or elongation.

All described features apply both for the roll as well as its use, whenever applicable, even if it not necessarily always stated so.

A typical roll according to the present invention for use in the manufacture of a fibrous web comprising cellulosic fibers, comprises
  a roll body with a cylindrical surface, and
  a roll cover, which is arranged to cover the cylindrical surface of the roll body, the cover comprising a functional layer, which comprises a polymer matrix and filler particles embedded in the polymer matrix, wherein the filler particles comprise hollow spherical particles of aluminium oxide, titanium oxide, zirconium oxide and/or silicon carbide, which hollow particles have a particle size of ≤200 µm.

The roll according to the invention is typically used in a paper machine, board machine, tissue machine or in a converting machine for a fibrous cellulosic web.

Now it has been surprisingly found that it is possible to improve more than one of the mechanical properties of the roll when the functional layer comprises hollow spherical particles of at least one specific inorganic oxide or silicon carbide. Especially unexpected advantageous effect has been observed in wear resistance which is much higher than could have been anticipated. It is currently assumed, without wishing to be bound by any theory, that it is mainly the hollow spherical form of the particles that produces the advantageous effects. It is anticipated that inside the functional layer the spherical particle surfaces may more easily "slide" in the polymer matrix than conventional angular or jagged particle forms with edges. The ductility of the roll cover becomes thus higher. On the surface area of the roll cover the spherical morphology of the filler particles produces lower friction between the rotating surfaces compared to irregular particle forms, which is beneficial in terms of wear properties that is an important feature especially in nip roll applications. Also, packing density of the filler is higher with spherical particles so that more filler may be used if desired without viscosity loss. Further, the hollow morphology of the particles provides a reduced density, which enhances the processing behaviour of the filler during the manufacture of the cover. The light-weight filler and the polymer are less likely to form separate phases in a casting container, as the heavy solid particles would do. As a result the quality of the cast cover is more uniform.

In the present context the term "spherical" means that the particles have a shape of a ball or a sphere. The hollow spherical particles are three-dimensional round particles, with a closed outer surface and a hollow interior. The outer surface of the spherical particles is non-porous. The surface of the spherical particles may have small deviations, such as cavities or elevations from complete roundness. According to one embodiment the hollow spherical particles are three-dimensional completely round particles.

The roll cover according to the present invention preferably comprises hollow spherical particles of at least one oxide of aluminium, titanium and/or zirconium. According to an embodiment the roll cover may comprise a mixture of hollow spherical particles of at least two of the following oxides: aluminium oxide, titanium oxide and zirconium oxide.

According to one embodiment the roll cover comprises hollow spherical particles of silicon carbide, either alone or together with one or several of the hollow spherical particles of aluminium oxide, titanium oxide or zirconium oxide.

The roll body is normally made of metal, such as cast iron or hardened steel, or of fiber reinforced plastic, and it has a cylindrical surface. The diameter of the roll body may vary according its location of use. For example, the diameter may be 200-1500 mm. The length of the roll body depends on the width of the machine. Typically the length of the roll body may be in the range of 2.5-12 m, usually 4-8 m.

The roll cover is arranged to enclose the cylindrical surface of the roll body. The roll cover forms a continuous sleeve around the surface of the roll body. The roll cover may comprise one or more layers. The outermost layer or the functional layer is the layer which is in contact with the fiber web or the fabric supporting the fiber web. The functional layer may be adhered directly to the roll surface or, more often, via one or more layers lying beneath the functional layer and between the roll surface, i.e. a base layer and one or more intermediate layer(s). The total thickness of the roll cover is typically 15-50 mm. The total thickness of the roll cover comprises all possible layers included in the roll cover.

The functional layer comprises a polymer matrix and filler particles embedded in the said polymer matrix. The filler particles, which comprise hollow spherical particles of the specified inorganic oxide or of silicon carbide, are substantially homogenously divided into the polymer matrix. This means that the concentration of filler particles, as well as the hollow spherical particles, is the same at both the inner and outer surface of the functional layer, as well as throughout the layer. The filler particles, including the hollow spherical particles, are homogenously divided in the axial and circumferential directions of the roll. The thickness of the functional layer may be 10-40 mm.

The polymer matrix of the functional layer may be rubber, thermosetting polymer or thermoplastic polymer. Suitable rubbers are, for example, natural rubbers, nitrile butadiene rubbers, hydrogenated nitrile butadiene rubbers, chloroprene rubbers, ethylene propylene diene (EPDM) rubbers, chlorosulphonated polyethylene (CSM) rubbers, and any of their mixtures. Suitable thermosetting polymers are, for example, various polyurethane resins and epoxy resins. Suitable thermoplastic polymers, although less used, are, for example, fluorothermoplastic polymers and polyphenylene sulphide, polyether ketone, polyether ether ketone, polyphtalamide, polyamide, polyetherimide, polyethersulphone, polysulphone and any of their mixtures.

The hollow spherical particles have a particle size of $\leq 200$ µm, preferably $\leq 100$ µm, more preferably $\leq 50$ µm. According to one embodiment of the invention the hollow spherical particles may have a particle size in a range of 0.01-200 µm, preferably 1-100 µm, more preferably 5-40 µm. It has been observed that when the particle size is within the defined ranges the roll cover shows good mechanical wear resistance and is smooth enough to ensure the suitability for web manufacturing processes.

According to one preferable embodiment of the invention the hollow spherical particles are particles of aluminium oxide. The aluminium oxide content of the hollow spherical particles may be >95 weight-percent, preferably >97 weight-percent, more preferably >99 weight-percent. Preferably the hollow spherical particles comprise hollow spherical particles of alpha-$Al_2O_3$. For example, the hollow spherical particles may comprise 20-30% of alpha-$Al_2O_3$ and 70-80% of delta-$Al_2O_3$. The hollow spherical particles may contain, in addition to aluminium oxide, trace amounts of trace oxides of iron, calcium, silicium and/or sodium oxide. The individual amounts of these trace oxides are typically <0.3 weight-percent, typically <0.1 weight-percent. The loss of ignition value for the spherical particles may be <0.5%.

According to one preferable embodiment at least 50%, preferably at least 70%, more preferably at least 80%, even more preferably at least 90%, of the filler particles are hollow spherical particles. It is possible to adjust the mechanical and dynamic properties of the roll cover by adjusting the amount of the hollow spherical particles in the polymer matrix.

The hollow spherical particles may have a hardness of $\geq 7$ Moh, preferably >8 Moh, more preferably >8.5 Moh.

According to one embodiment of the present invention the hollow spherical particles comprise a shell wall surrounding an internal closed cavity. In other words, the hollow particles comprise an empty cavity inside the particle. The shell wall surrounds the internal cavity, and at the same time forms the outer surface or the hollow particle. The shell wall may have a thickness in the range of 1-50 µm, preferably 1-30 µm, more preferably 2-25 µm.

The roll cover may have a surface roughness in the range of 0.1-10 Ra, and/or hardness in the range of 25 ShD-96 ShD, which approximately corresponds to P&J hardness in the range of 1-50.

According to one embodiment of the invention the hollow spherical particles may be surface modified. For example, coupling agents may be arranged in connection with the particle surface. Coupling agents improve the interaction between the surface of the hollow spherical particle and the surrounding polymer matrix. In this manner it is possible to improve the chemical compatibility between the spherical particles and the surrounding polymer matrix and consequentially the mechanical properties of the roll cover. Possible coupling agents may be selected, for example, from silane based coupling agents. Silane based coupling agents may comprise vinyl, amino, epoxy and/or sulphide groups for proper interaction between the spherical inorganic and polymer matrix.

According to one embodiment of the invention the polymer matrix of the functional layer is rubber, which comprises at the maximum of 40 weight-percent, preferably at the maximum of 25 weight-percent, more preferably at the maximum of 7.5 weight-percent, of hollow spherical particles. According to one embodiment the polymer matrix of the functional layer is rubber, which comprises 1-40 weight-percent, preferably 1-25 weight-percent, more preferably 2.5-7.5 weight-percent, of hollow spherical particles.

According to another embodiment of the invention the polymer matrix of the functional layer is epoxy resin, which comprises at the maximum of 50 weight-percent of hollow spherical particles, embedded into the matrix. Preferably the roll is a calender roll. According to another embodiment the roll may be a press roll, suction roll, sizer roll or a coater roll.

According to one embodiment of the invention the polymer matrix of the functional layer is polyurethane resin and it comprises at the maximum of 10 weight-percent of hollow spherical particles, embedded into the matrix. Preferably the roll is a press roll, suction roll, sizer roll or a coater roll.

The polymer matrix of the functional layer may comprise additional filler particles in addition to hollow spherical particles. Further, the polymer matrix may comprise second, third and any successive additional filler particles. The additional filler particles may be selected from inorganic particles, such as particles of silica, silicon carbide, carbon black, titanium oxide, feldspar, kaolin; or from organic particles, such as particles of aramid or polyethylene or rubber. The additional filler particles may have an average particle diameter of over 5 µm, preferably in the range of 10-300 µm. Use of one or more additional filler particles make it possible to adjust the mechanical properties in each or any layer of the roll cover in a proper, flexible and cost effective manner.

According to one embodiment of the present invention the functional layer comprises both hollow spherical particles, preferably of aluminium oxide and at least non-hollow silica carbide particles as additional filler particles. It has been observed that this combination gives good performance properties for the roll cover, especially improved wear properties.

In case the functional layer comprises additional filler particles, the amount of hollow spherical particles is at least 30 weight-percent, preferably at least 45 weight-percent, more preferably at least 70 weight-percent, of total weight of the filler particles. The total weight includes the weight of hollow spherical particles and additional filler particles.

According to one embodiment of the invention the functional layer comprises solely hollow spherical particles and is free from any other inorganic and/or organic filler particles. Especially the roll cover is free of particles of silica based oxides and/or silicate. It has been observed that particles of silica based oxides and silicates may not perform in a satisfactory manner when used as fillers in roll covers, at least when compared to hollow spherical particles of aluminium, titanium and/or zirconium oxides.

The roll cover may comprise, in addition to the described functional layer, a base layer which is arranged preferably in direct contact with the roll surface, and at least one optional intermediate layer, which is arranged between the functional layer and the base layer. The base layer and the optional intermediate layer may comprise the same or a different polymer matrix as the functional layer. In case the roll cover has a base layer and optional intermediate layer, these layers may also comprise additional filler particles embedded in the polymer matrix. The polymer matrix of the base layer and the optional intermediate layer may comprise the same or different additional filler particles as the functional layer. The additional filler particles in the different layers may be the same or different. However, the base layer and the optional intermediate layer are preferably free of hollow spherical particles of aluminium oxide, titanium oxide, zirconium oxide and/or silicon carbide.

Alternatively, or in addition to additional filler particles, the functional layer, and the possible base and intermediate layers, may also comprise additives, such as polymerisation initiators, activators and accelerators, plasticisers, thermal stabilisers, filler dispersants. These additives may also be present in other layers of the cover.

BRIEF DESCRIPTION OF THE DRAWINGS

Some embodiments of the invention are explained more closely in the following schematical non-limiting drawings.

DESCRIPTION OF THE PREFERRED EMBODIMENTS

Figure 1:
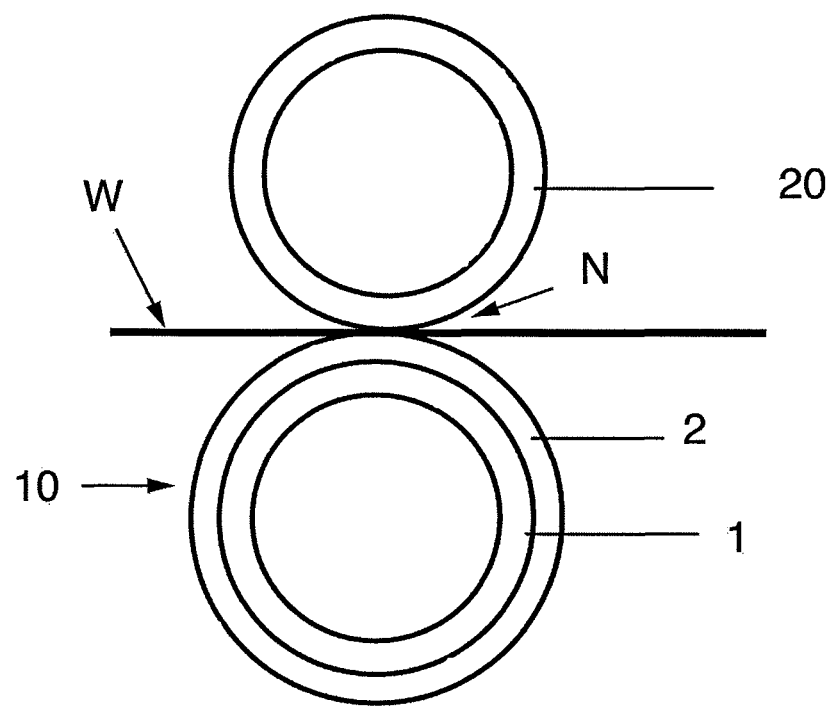
FIG. 1 shows a nip roll arrangement in a paper or board machine.

FIG. 1 shows a nip roll arrangement in a paper or board machine. Two parallel rolls 10, 20 are located adjacent to each other and form a nip N between them. One or both of the rolls 10, 20 may be loadable against each other. Rolls 10, 20 may be rolls of a calender, a press, a coater or a sizer. A web W of a paper or board is running through the nip N either unsupported or supported by a belt or felt. Both of the rolls have a metal body or shell 1 and at least one of them has a roll cover 2, made of polymer and arranged to enclose the metal body or shell 1.

Figure 2:
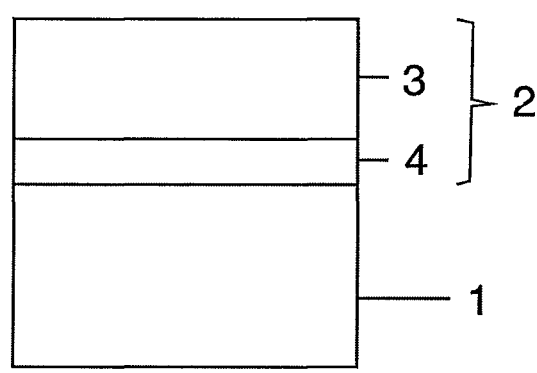
FIG. 2 shows a more detailed view of a roll and roll cover.

FIG. 2 shows a more detailed view of a roll and roll cover. The cover 2 comprises at least a functional layer 3 which is the outermost layer of the cover 2 and provides the surface of the metal body 1 of the roll. During the manufacture of paper or board the functional layer 3 is in contact either with a fibrous web or a fabric supporting the fibrous web, and thus the functional layer is exposed to wear and the stress from the environment. The functional 3 layer comprises at least one filler and optionally reinforcing fibers.

Beneath the functional layer 3 there may be one or more intermediate layer(s) 4, which provide an adhering layer between the metal body 1 and the functional layer 3. The intermediate layer(s) 4 may further provide other tailored properties for the cover 2, for example in terms of grading hardness, thermal conductivity, etc. The intermediate layer(s) 4 may comprise fiber reinforcement. The one or more of the intermediate layer(s) 4 may further comprise at least one filler. The filler in the intermediate layer(s) may be the same as or different from the filler in the functional layer 3. In case of two or more intermediate layers, the filler in the individual intermediate layers may be the same or different. The amount of the filler in the intermediate layer 4 is preferably lower than the amount of the filler in the functional layer 3.

EXPERIMENTAL

Some embodiments of the invention are described in the following non-limiting examples, where cover compositions for calender rolls or sizer rolls were tested using varying filler compositions.

Examples 1-3

Three samples simulating calender roll covers were prepared. A resin composition comprising bisphenol-F epoxy resin, diethyl toluene diamine hardener and a filler was made. The resin composition was the same in all examples 1-3, only the filler type was varied as shown in Table 1.

Example 1 represents an embodiment according to the invention, while examples 2 and 3 represent comparative embodiments. In Example 1 the used filler comprised hollow aluminium oxide spheres having particle size of 5-40 μm (supplied by Kit-Stroy SPb, Russia). In Comparative Example 2 the used filler comprised silica having a D50 particle size of 3 μm (supplied by Sibelco, Finland) and in Comparative Example 3 the used filler comprised silicon carbide having a D50 particle size of 3 μm (supplied by Saint-Gobain).

Each resin composition thus obtained was applied to aramide fiber sheet and laminate plates with thickness of 12 mm was built. The laminate plates were cured at a temperature of 150° C. for 8 hours. Several mechanical tests were performed to the laminate plates. The wear test was performed as a rubber wheel wear test slightly modified from standard ASTM G65 giving material loss in $mm^3$/Nm. Other tests performed were hardness (H), measured as Shore D hardness, tensile strength (TS), elongation at break (E) and impact strength (IS), measured as Charpy impact test. The measured value for the embodiment according to the invention (Example 1) is given in Table 1 as an absolute value, while the values for the comparative examples 2 and 3 are given as a percentage in relation to Example 1. A positive percentage value for wear indicates that the surface is more prone to wear, which is undesired. Negative percentage values for hardness, tensile strength, elongation and impact strength indicate that the surface has lower strength properties, which is undesired.

Examples 4-5

Examples 4-5 compare the effect of material and hardness of the microsphere filler in a composite. Epoxy composition comprising bisphenol A epoxy resin, diethyl toluene diamine hardener and filler was applied on aramid fiber sheets in a similar way as described in examples 1-3.

Example 4 represents an embodiment according to the invention while Example 5 represents a comparative example. The laminate plate in Example 4 contains 25 w-% hollow aluminium oxide spheres with a particle size of 5-40 μm (supplied by Kit-Stroy SPb, Russia). In Example 5 the hollow aluminium oxide spheres of Example 4 were replaced with the same amount of alkali aluminosilicate microspheres having a D50 particle size of 5 μm and hardness of 7 Mohs Scale (supplied by 3M).

Surprisingly it was found that Example 4, i.e. an embodiment according to the invention, gave better performance over the comparative Example 5 for all tested properties. Thus, it may be assumed without wishing to be bound by a theory that it is not the spherical form of the particles alone which provides the improved performance for the roll cover. It seems that due to the hollow morphology of the particles the properties of the roll cover were improved.

Examples 6-8

Three samples simulating a sizer roll cover were prepared. A polyurethane composition was made by mixing PPDI-terminated polyether prepolymer, an amine hardener and a filler. The polyurethane composition was the same in all examples 6-8, only the filler type was varied as shown in Table 1.

Example 6 represents a comparative example, while Example 7 and Example 8 represent embodiments according to the invention. In comparative Example 6 the filler was calcined alumina with particle size of 3 μm (supplied by Almatis). In Examples 7 and 8 the calcined alumina filler of Example 6 was replaced by hollow aluminium oxide spheres having particle size of 5-40 μm (supplied by Kit-Stroy SPb, Russia). The obtained resin compositions with filler were mold-cast and post-cured at 130° C. for 20 hours. The wear test was performed as a rubber wheel wear test slightly modified from ASTM G65 giving material loss as $mm^3$/Nm. The measured value for the comparative test is given as an absolute value in Table 1 while the values for the Examples 7 and 8 according to the invention are given as percentage in relation to Comparative Example 6. A negative percentage value for wear indicates that the surface is more resistant to wear, which is desired.

Examples 9-10

Acrylonitrile butadiene rubber with a carbon black content of about 70 phr and cured hardness of 85 Shore A was used as the test matrix for hollow aluminium oxide spheres having particle size of 5-40 μm (supplied by Kit-Stroy SPb, Russia). By adding 5 w-% of hollow aluminium oxide spheres into the rubber composition the abrasion loss decreased by 30%. In Examples 9-10 the test method for wear was DIN 53516, giving abrasion loss in $mm^3$.

It can be seen from the results in Table 1 that the improvements which are obtained by roll cover compositions comprising hollow aluminium oxide particles are on a surprisingly high level in all aspects. Especially, abrasive wear values showed good and unexpected improvement with all tested polymer types. It can be seen that the obtained improvement in abrasive wear was over 20%.

TABLE 1

Polymers, filler details and results for Examples 1-10.

| Example | Polymer type | Standard calcined Al$_2$O$_3$, [weight-%] | Al$_2$O$_3$, hollow spheres [weight-%] | SiO$_2$, [weight-%] | SiC, [weight-%] | Alkali alumino Silicate spheres, [weight-%] | Wear, [mm$^3$/Nm]/[mm$^3$]* | H, [ShD] | TS, [MPa] | E, [%] | IS, [N/mm] |
|---|---|---|---|---|---|---|---|---|---|---|---|
| 1 | Epoxy | — | 14 | — | — | | 0.016 | 87 | 57.2 | 2.7 | 10.7 |
| 2(C) | Epoxy | — | — | 14 | — | | +32% | −1% | −19% | −33% | −30% |
| 3(C) | Epoxy | — | — | — | 14 | | +23% | 0% | −17% | −30% | −36% |
| 4 | Epoxy | — | 25 | | | | 0.0072 | 89 | 104 | 2.8 | 28.4 |
| 5(C) | Epoxy | — | | | | 25 | +70% | −2% | −13% | −7% | −27% |
| 6(C) | PU | 2.5 | — | — | — | | 0.0067 | — | — | — | — |
| 7 | PU | — | 2.5 | | | | −38% | — | — | — | — |
| 8 | PU | — | 5.0 | | | | −61% | — | — | — | — |
| 9(C) | Rubber | — | — | — | — | | 195* | | | | |
| 10 | Rubber | — | 5.0 | | | | −30% | | | | |

(C)= comparative example
*= DIN abrasion

Examples 11-14

Four samples simulating a calender roll cover were prepared using an epoxy composition comprising bisphenol epoxy resin, diethyl toluene diamine hardener and a filler. The filler used was silicon carbide, hollow aluminum oxide microspheres or their mixture. Used fillers and their amounts in Examples 11-14 are given in Table 2. In Comparative Example 11 only SiC was used as a filler. In Examples 12-14 SiC filler was gradually replaced by the hollow aluminum oxide microspheres, in portions of 50%, 75% and 100%.

The mechanical tests were performed in the same manner as for Examples 1-3, and the results are given in the same manner as for Examples 6-8, using the measured value for the Comparative Example 11 as an absolute value.

TABLE 2

Filler details and results for Examples 11-14.

| Example | Resin type | SiC, % of the filler | Al$_2$O$_3$ spheres, % of the filler | Wear [mm$^3$/Nm] | H, [ShD] | TS, [MPa] | E, [%] | IS, [N/mm] |
|---|---|---|---|---|---|---|---|---|
| 11 (C) | Epoxy | 100 | 0 | 0.0075 | 89.8 | 68.7 | 1.6 | 9.68 |
| 12 | Epoxy | 50 | 50 | −16% | +1.6% | 0% | +6% | +8% |
| 13 | Epoxy | 25 | 75 | −19% | +2.9% | −12% | 0% | +1% |
| 14 | Epoxy | 0 | 100 | −35% | +2.0% | +45% | 38% | +91% |

(C) = Comparative Example

It can be seen from the results in Table 2 that improvements may be obtained by roll cover compositions comprising hollow aluminium oxide particles almost in all aspects. Especially, abrasive wear values showed good and unexpected improvement.

When testing dynamic behavior in terms of tan-delta as a function of temperature it was found that a roll cover according to the invention and comprising hollow aluminium spheres behaved very similarly, almost identically to the SiC filled roll cover. Based on all the tests performed it can be concluded that all the basic properties of a roll cover were improved without compromises, which is rarely achieved by a single raw material alone.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

I claim:

1. A paper or board machine roll for use in the manufacture of a paper or board web comprising cellulosic fibers, the roll comprising:
    a roll body with a cylindrical surface;
    a roll cover covering the cylindrical surface of the roll body;
    wherein the cover comprises a functional layer which comprises a polymer matrix and filler particles embedded in the polymer matrix;
    wherein the filler particles comprise hollow spherical particles made of a material selected from the group consisting of: aluminum oxide, titanium oxide, zirconium oxide and silicon carbide; and
    wherein the hollow spherical particles comprise 2.5 to less than 50 weight % of the matrix and have a particle size of less than or equal to 200 micrometers.

2. The paper or board machine roll of claim 1 wherein the hollow spherical particles are at least 50 to 90% of all filler particles in the matrix.

3. The paper or board machine roll of claim 2 wherein the hollow spherical particles are at least 80 to 90% of all filler particles in the matrix.

4. The paper or board machine roll of claim 3 wherein the hollow spherical particles are at least 90% of all filler particles in the matrix.

5. The paper or board machine roll of claim 1 wherein the hollow spherical particles comprise a shell wall surrounding an internal closed cavity, wherein the shell wall has a thickness in the range of 1-50 μm.

6. The paper or board machine roll of claim 1 wherein the hollow spherical particles have a particle size in a range of 5-40 µm.

7. The paper or board machine roll of claim 1 wherein the hollow spherical particles have a hardness of greater than 8.5 Moh.

8. The paper or board machine roll of claim 1 wherein the hollow spherical particles are particles of aluminum oxide.

9. The paper or board machine roll of claim 1 wherein the polymer matrix of the functional layer is rubber, or thermosetting or thermoplastic polymer.

10. The paper or board machine roll of claim 9 wherein the polymer matrix of the functional layer is rubber, and wherein the functional layer comprises at maximum 40 weight-percent of hollow spherical particles.

11. The paper or board machine roll of claim 9 wherein the roll is a calender roll.

12. The paper or board machine roll of claim 9 wherein the polymer matrix of the functional layer is polyurethane resin and wherein the functional layer comprises at maximum 10 weight-percent of hollow spherical particles, embedded into the matrix.

13. The paper or board machine roll of claim 9 wherein the roll is a press roll, suction roll, sizer roll or a coater roll.

14. The paper or board machine roll of claim 1 wherein the polymer matrix of the functional layer further comprises at least one of: additional filler, particles, and additives.

15. The paper or board machine roll of claim 1 wherein the hollow spherical particles are surface modified.

16. The paper or board machine roll of claim 1 wherein the functional layer of the roll cover has a thickness of 10-40 mm, and wherein in addition to the functional layer the roll cover comprises a base layer, which is arranged in contact with the roll surface and an optional intermediate layer, which is arranged between the functional layer and the base layer.

17. The paper or board machine roll of claim 1 wherein the polymer matrix is epoxy, and the hollow spherical particles comprise 5 to less than 50 weight % of the matrix and the hollow spherical particles have a size of 1-100 micrometers and the hollow spherical particles have a shell wall surrounding an internal closed cavity, wherein the shell wall has a thickness in the range of 1-50 micrometers.

18. The paper or board machine roll of claim 1 wherein the polymer matrix is rubber, and the hollow spherical particles comprise 2.5 to less than 40 weight % of the matrix and the hollow spherical particles have a shell wall surrounding an internal closed cavity, wherein the shell wall has a thickness in the range of 2-25 micrometers.

19. The paper or board machine roll of claim 1 wherein the polymer matrix is polyurethane, and the hollow spherical particles comprise 2.5 to less than 10 weight % of the matrix and have a particle size of 4-40 micrometers and the hollow spherical particles have a shell wall surrounding an internal closed cavity, wherein the shell wall has a thickness in the range of 1-30 micrometers.

20. A roll in a paper machine, board machine, tissue machine or in a converting machine for a fibrous cellulosic web, the roll comprising:
a roll body with a cylindrical surface;
a roll cover covering the cylindrical surface of the roll body;
wherein the cover comprises a functional layer which comprises a polymer matrix and filler particles embedded in the polymer matrix;
wherein the filler particles comprise hollow spherical particles of 2.5 to less than 50 weight % of the matrix and are made of a material selected from the group consisting of: aluminum oxide, titanium oxide, zirconium oxide and silicon carbide; and
wherein the hollow spherical particles have a particle size of less than or equal to 200 micrometers.

21. A method of forming or converting a fibrous cellulosic web comprising engaging a roll with a web within a paper machine, a board machine, a tissue machine or in a converting machine, the roll comprising:
a roll body with a cylindrical surface;
a roll cover covering the cylindrical surface of the roll body;
wherein the cover comprises a functional layer which comprises a polymer matrix and filler particles embedded in the polymer matrix;
wherein the filler particles comprise hollow spherical particles made of a material selected from the group consisting of: aluminum oxide, titanium oxide, zirconium oxide and silicon carbide; and
wherein the hollow spherical particles comprise 2.5 to less than 50 weight % of the matrix and the hollow spherical particles have a particle size of less than or equal to 200 micrometers.

\* \* \* \* \*